United States Patent [19]

Moscarini

[11] 4,013,194

[45] Mar. 22, 1977

[54] DEVICE FOR METERING BY WEIGHT THE DELIVERY OF LIQUIDS

[75] Inventor: Filippo Moscarini, Rome, Italy

[73] Assignee: I.S.A.M. Istituto Sperimentale Auto e Motori S.p.A., Anagni (Frosinone), Italy

[22] Filed: May 13, 1975

[21] Appl. No.: 577,131

[30] Foreign Application Priority Data

May 14, 1974 Italy .................................. 50985/74

[52] U.S. Cl. .............................. 222/23; 73/194 M; 73/223; 222/56

[51] Int. Cl.[2] ...................... B67D 5/38; G01F 1/86

[58] Field of Search ............ 73/194 R, 194 M, 223, 73/224; 137/392, 403, 412; 222/55, 64, 67, 56, 36, 23; 235/151.34

[56] References Cited

UNITED STATES PATENTS

| | | | |
|---|---|---|---|
| 1,832,809 | 11/1931 | Hudson | 137/412 |
| 2,530,981 | 11/1950 | Mikina | 137/412 X |
| 2,543,522 | 2/1951 | Cohen | 137/412 X |
| 3,420,263 | 1/1969 | Ohlsson | 137/392 |
| 3,855,458 | 12/1974 | Motter et al. | 137/403 X |

Primary Examiner—Robert B. Reeves
Assistant Examiner—Francis J. Bartuska
Attorney, Agent, or Firm—Pollock, Vande Sande & Priddy

[57] ABSTRACT

A device for metering by weight the delivery of liquids, comprising a container for the liquid fed through an electrovalve and having a delivery aperture and a spillway; a metering body immersed in said liquid and anchored in rest position by anchoring means; a mechanical-electric transducer inserted between the metering body and the container for the liquid, and connected to a first, to a second, and to a third comparator, in order to drive the first comparator and the third comparator, which through a first flip flop and an amplifier control the closure and the aperture of the electrovalve, respectively, as well as the second comparator, also driven by the transducer in order to control through a second flip flop a timer and a voltmetric digital indicator driven in turn by the transducer; an external generator controlling through a push switch both said flip flops.

8 Claims, 2 Drawing Figures

DEVICE FOR METERING BY WEIGHT THE DELIVERY OF LIQUIDS

The present invention relates to a device for metering, by weight, the amount of a liquid delivered and, more particularly, a device allowing an indication of the weight of a liquid delivered in a predetermined interval of time.

Devices for metering the delivery of liquids, e.g., devices for metering the consumption of fuels in various applications, can be either of the type metering by weight or of the type metering by volume. The devices operating by volume, i.e., volumetric devices, meter the time necessary for consuming a certain volume of liquid, if the case may be, which can be prefixed to different values as use is made of a set of suitable containers. Said metering devices have the drawback of requiring the transformation of the volume to weight by a calculation requiring the measurement of temperature in order to determine density. Notwithstanding these drawbacks, the volumetric devices are generally preferred due to their simplicity, their sturdiness, and generally speaking, their low cost.

Devices operating by weight are generally more complex and delicate. Such devices use actual balances acting on electrical contacts which operate chronometers and/or revolution counters, in correspondence with the attainment of pre-fixed weights. These metering devices have only drawbacks of encumbrance, cost and delicacy. Furthermore, it is to be noted that, e.g., consumption is calculated in terms of a weight/time ratio while the aforesaid devices register the time for consuming a known weight, or, worse yet, a known volume which must then be converted to weight by measuring its density. The density, in turn, is another variable value, since it depends upon the temperature of the fluid.

The purpose of the present invention is that of embodying a metering device capable of displaying directly, by weight, the delivery of a fluid, in units of time, e.g., the consumption per hour of a fluid.

The main advantage of the device according to the invention in respect of the balance meterng devices are its greater simplicity, its sturdy construction and the reduced space required. Furthermore, the device according to the invention is capable of being connected to data acquisition systems, and assures maximum speed of metering at any rate of delivery.

Another advantage of the metering device according to the invention consists in its cost, which is less than the cost of the balance metering devices, and comparable to that of the volumetric devices.

The device according to the invention consists of a mechanical part and of an electronic part. The mechanical part comprises a container for the liquid which is to be metered, said container being provided with suitable means, for instance a spillway, in order to prevent overflow of the fluid in case complications arise. Into this fluid is partialy immersed a metering body having a constant specific gravity, i.e., being undeformable, in order to prevent alteration of the metering operations due to the pressure of the fluid, and having a negligible coefficient of thermal expansion, in order to prevent alterations of the metering operations due to the temperature of the fluid.

The immersed metering body will receive a vertical thrust equal to the weight of the displaced fluid into which it is immersed. During the metering of consumption, the level of the fluid within the container will decrease, thereby diminishing the extent of immersion of the metering body in the fluid, and thus the vertical thrust on the partially immersed metering body. The measure of the difference of the force exerted by the fluid on the partially immersed metering body can be rendered linearly proportional to the weight of the fluid delivered from the container.

Any mechanical electric transducing means capable of converting the physical value of the force into an electrical value of either a current or a voltage can be used for indicating the weight delivered in a perdetermined time, so as to obtain a digital display directly of weight per hour in grams per hour, or in other desired units.

Further features and characteristics of the metering device according to this invention will become evident from the following specification, relating to the attached drawings, wherein is described and shown, respectively, by way of example, a preferred embodiment of invention.

Figure 1:
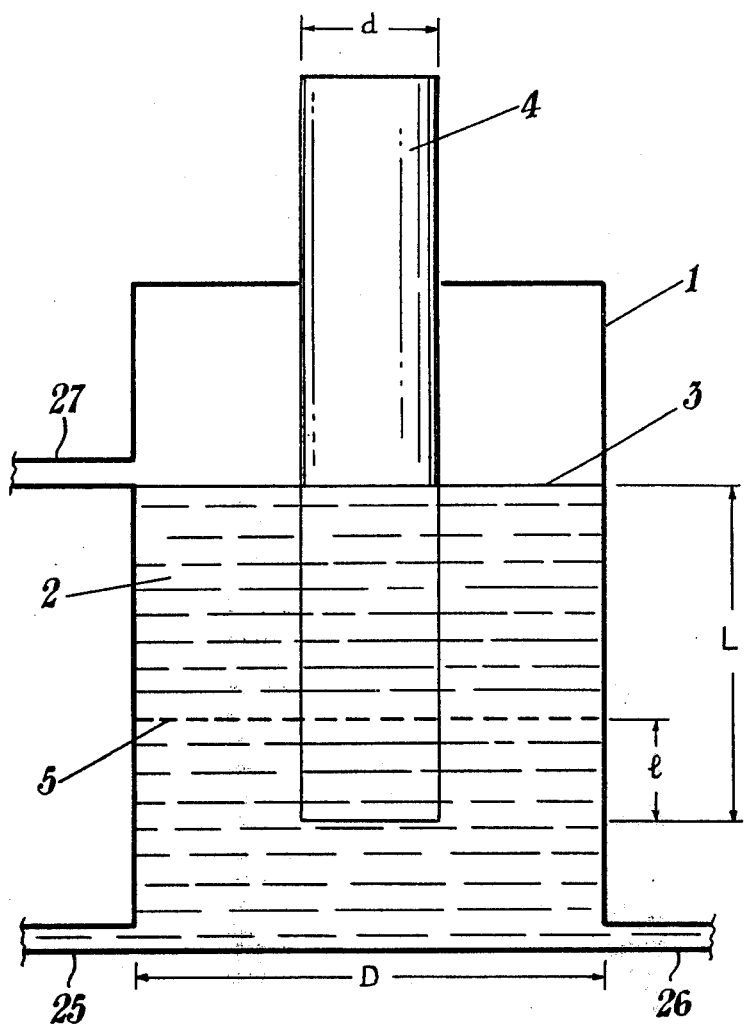
FIG. 1 shows a diagrammatical vertical view of the fluid container of the metering device according to the present invention.

With reference to FIG. 1, therein it is shown that the cylindrical container 1 is provided with an inlet aperture 25, an outlet aperture 26 and a spillway 27.

The container 1 is filled with the fluid supplied through the inlet aperture 25, up to the level shown at 3.

In this liquid is partially immersed, and held in rest position, the metering cylindrical body 4. The anchoring of the metering body 4 is embodied, as it will be clearly described later on, by the springs 8 and 9 which, even if determining the rest position of the metering body 4, will deflect to an extent proportional to the vertical thrust that the body 4 receives from the liquid in which it is immersed.

Connected to the supporting springs for the metering body is the core 7 of a differential transformer 10 the function of which will be explained hereinafter.

The output voltage from the differential transformer 10 which acts as a force-voltage transducer, will be aplied to the non-inverting inputs $a$ of three comparators 13, 14 and 15, which receive their other input, an inverting input $b$, from three associated reference voltage generators 16, 17 and 18, respectively. The output $c$ from the comparator 13 is connected to the input $j$ of the first flip-flop 19 of JK type. The output from the comparator 15 is connected to the input $k$ of the flip-flop 19. The output from the comparator 14 is connected to the input $j$ of a second flip-flop 22 of JK type, which receives the reset input R from an external generator not shown in the figure, through a control press switch T. The reset input of the flip-flop 19 comes from said external generator through said control press switch T and the output Q of the flip-flop 19 controls the electro-valve 28 which feeds the liquid to the container 1. The output Q from the second flip-flop 22 is connected to a timer 23 and to a digital voltmeter 24 driven by the output voltage from the differential transformer 10 through the conductor 29. The digital voltmeter 24 is normally blocked.

The timer 23 is an electronic or electro-mechanical timer which, when it receives a control or input pulse at $f$, starts counting a pre-established time, at the end of which it emits an output pulse at $g$, and returns to the rest state, ready to repeat the operation at each subsequent control pulse.

The voltmeter 24 is a digital voltmeter embodied by means of an analog converter having a "hold" control (e), i.e., able to hold the digital display as long as the "hold" control is maintained.

If the metering cylindrical body is buoyant, then the force exerted by the metering body 4 on its anchoring will be:

$$F = \frac{\mu L d^2 \pi}{4} - P$$

P = weight of the metering body 4;
D = diameter of the cylindrical container 1;
$\mu$ = specific gravity of the liquid 2;
d = diameter of the cylindrical body 4;
L = length of the part of the metering cylindrical body 4 immersed into the liquid 2 when the liquid is at its starting level.

When the level of the liquid 2 changes from the starting level, to a second predetermined level (denoted by 5), there will be a difference of force $\Delta F$, which is expressed by:

$$\Delta F = \frac{\mu (L - 1) d^2 \pi}{4}$$

wherein $l$ is the length of the immersed part of the metering cylindrical body 4 when the liquid 2 reached the second pre-established level 5.

For the weight of the liquid delivered from the cylindrical container 1, we shall have that the weight of the fluid $p_f = \mu V_f$, wherein $V_f$ is the volume of the fluid, and therefore:

$$P_f = \frac{\mu (L - 1)(D^2 - d^2)\pi}{4}$$

From the above it is evident that the value of $\Delta F$ is linearly proportional to the weight of the fluid delivered from the container 1 as $$\frac{\Delta F}{\Delta P_f} = \frac{d^2}{D^2 - d^2}$$

and this ratio is related solely to the geometrical dimensions of the instrument. This result does not take into consideration the displacement of the body 4 due to the variation of the force $\Delta F$, displacement which, if taken into consideration, will render more complicated the above expressions only as far as their form is concerned.

Figure 2:
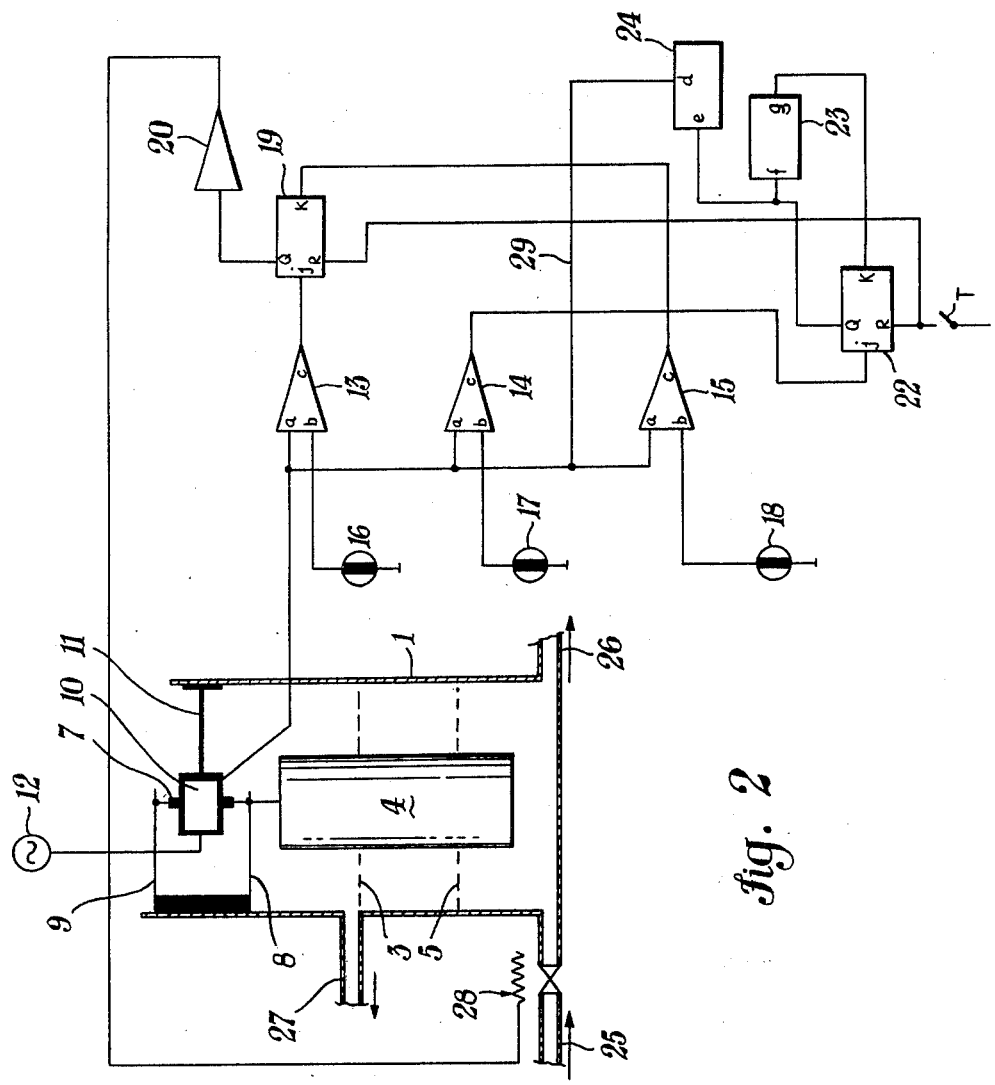
FIG. 2 shows a diagrammatical view of the container for the fluid of FIG. 1, as combined with a display/timing circuit according to this invention, shown in its block diagram.

With reference to FIG. 2, the combination of the container 1 with the timing and display electric circuit, as well as its mode of operation, will be disclosed. The container 1 is fed through the electrovalve 28 by the duct 25 connected, if necessary with the intervention of pumps, to the supply tank, not shown in the FIGURE, for the fluid which is to be metered. The duct 26 connects with the engine device or burner, the fuel consumption of which is to be metered. In the container 1 the liquid can reach at most, only the weight allowed by the value of the voltage of the reference generator 18. Inside the container 1 the metering cylindrical body 4 is supported so as to be immersed only partially in the liquid. The metering body 4 is mechanically connected to the core 7 of a differential transformer 10. The support of the metering body 4 comprises a pair of centering leaf springs 8 and 9, while the body of the differential transformer 10 is fixed by a support 11 to the cylindrical container 1. A generator 12 of alternating voltage, having an adquate voltage and frequency, feeds the primary winding or energizing winding of the differential transformer 10. The output voltage from the differential transformer 10, suitably filtered and rectified is applied to the non-inverting input $a$ of the three comparators 13, 14 and 15. The reference sources 16, 17 and 18, connected to the inverting inputs $b$, are adjusted so as to correspond to three different values of weight of the fluid contained in the container 1.

Due to this arrangement, considered as a starting condition the condition in which the electrovalve 28 is not energized, and is therefore closed, the outlet of the liquid through the delivery duct 26 causes a diminution of the liquid level in the container, with a consequent diminution of the degree of immersion of the metering cylindrical body 4 and of the thrust force which it receives by the liquid.

Therefore, the metering body 4 tends to move downwards, causing an increase of the output voltage from the differential transformer 10 until said voltage overcomes the pre-fixed value of the voltage of the reference source 16 of the comparator 13.

At the moment when this overcoming occurs, the comparator 13 changes its output, causing the flip-flop 19 to change state, and this flip-flop, through amplifier 20, energizes the electrovalve 28. By the energizing and the consequent opening of the aperture of the electrovalve 28, the container 1 is fed through the duct 25 and further fluid enters into the container 1.

When the amount of fluid within the container 1 increases its level also increases and therefore the thrust on the metering body 4, and the output voltage from the differential transformer 10, will diminish until it reaches the value of the voltage of the reference generator 18 of the comparator 15. At the moment when the output voltage from the differential transformer 10 falls below the value of the voltage of the reference generator 18, the comparator 15 will invert its output level, and this will cause flip-flop 19 to change its state. The switching of the flip-flop 19 cuts off, through amplifier 20, the energizing of the electrovlave, thereby causing the closure thereof.

Under these conditions, as aforesaid, the amount of fluid within the container 1 will again start decreasing, thus reducing the thrust exerted on the body 4 and again causing the increase of the output voltage from the differential transformer 10. It is clear that the sequence as described above will continue indefinitely. As a consequence thereof, the amount of the liquid contained within container 1 will always be variable within the limits pre-established by the values of the sources of the reference voltages 16 and 18.

When by means of a suitable control push button T the flip flop 19 is caused to energize electrovalve 28 through amplifier 20, the device is placed in its starting position, and flip-flop 22 will be predisposed to accept the pulse coming from comparator 14. As a consequence thereof, as soon as the weight of the fluid reaches the value pre-fixed by the reference source 18, the comparator 15 will again cause the change of the state of the flip-flop 19, which will cause the de-energization or closure of electrovalve 28, through amplifier 20. The result will be that, as always when electrovalve 28 is closed, that the fluid, flowing out of container 1, will start decreasing and therefore reducing its thrust on the cylindrical body 4. Due to said decrease of thrust, the value of the output voltage from the differential transformer 10 will proportionally increase, and when it reaches the prefixed value of reference source 17, the comparator 14 will cause the change of state of flip-flop 22. The change of state of flip-flop 22 enables the operation of the timer 23 and simultaneously removes the blocking of the display digital voltmeter 24 which directly indicates the weight of the fluid delivered from the container, beginning from the moment when metering is started, which moment is established as aforesaid by the change of state of the flip-flop 22, i.e., by the reaching of the weight of fluid as pre-determined by the reference source 17 of the comparator 14.

The indication supplied by the display voltmeter 24 is driven, through the conductor 29, by the differential transformer 10, the output from which obviously depends on the force that the metering body 4 imparts to the anchoring springs 8 and 9. It is to be noted that, as already explained, the difference of force $\Delta F$ that the metering body 4 exerts on the anchoring springs 8 and 9, in correspondence with two different weights of the liquid within the container 1, is directly proportional to the difference of weight $\Delta Pf$ of the liquid in correspondence of the same levels.

The timer 23 after a rigorously constant and pre-fixed time, forming one of the instrumental constants, emits one pulse which resets the flip-flop 22 and blocks again the digital voltmeter 24, the indication of which will remain fixed at the value of the final weight of the fluid delivered from the container during the working time as pre-fixed by the timer 23. By suitably predisposing the value of the voltage of the generator 12, the sensitivity of the differential transformer 10, the characteristics of the springs 8 and 9, the geometrical dimensions of the container 1 and of the body 4, the sensitivity and the rest of the voltmeter digital indicator 24, and the value of the working time of the timer 23 it is easy to obtain that the digital indication of the voltmeter digital indicator will display in grams per hour, kilograms per hour, grams per minute, pounds per hour, or in any other unit, the amount of fluid delivered during the metering time as established by the timer 23.

In a modified embodiment of this invention, the transducer is connected to only two comparators so that the comparator which controls the electrovalve will control simultaneously the flip-flop controlling the timer and the digital voltmeter.

In another embodiment of this invention, the timer is replaced and integrated by an event counter so as to relate the delivery by weight of liquids to events such as for instance the number of revolutions of an engine, the completion of a work, and the like.

A further embodiment of this invention provides that the transductor of force operated by the partially immersed body consists instead of a differential transformer, of a transducer using extensimetric devices, electro-optical devices, or devices operated by capacity variations, inductance variations, or reluctance variations, and/or using electronic servo devices so that the signal obtained from the transducer will control the current of a movable coil immersed in a magnetic field in order to generate a force capable of balancing the force acting on the transducer.

Having thus described the present invention, what is claimed is:

1. A device for measureing delivery of liquid by weight which eliminates the necessity for weighing a container comprising:
   a container for said liquid and an electrically controlled valve controlling the flow of said liquid to said container,
   a delivery aperture in said container for delivery of said liquid,
   a metering body immersed in said liquid,
   means supporting said metering body for limited movement in response to changes in liquid level in said container,
   a mechanical-electrical transducer coupled to said metering body and producing electrical signals related to the movement of said metering body,
   comparator means connected to said transducer producing a plurality of distinctive electrical signals when said body is in a corresponding plurality of distinctive positions as a result of various levels of said liquid,
   a bi-stable device coupled to the output of said comparator means controlling the condition of an amplifier for operating said electrically controlled valve,
   a second bi-stable device also coupled to the output of said comparator means, a timer for timing out a predetermined period in response to operation of said second bi-stable device and a digital indicator driven by said transducer when said timing means is timing out said predetermined period whereby the condition of said digital indicator at the conclusion of said predetermined period indicates the rate of liquid delivery.

2. The apparatus of claim 1 wherein said comparator means comprises a trio of comparators, each having an input coupled to the output of said transducer,
   a trio of different references, each coupled respectively to a second input of said comparators.

3. The device of claim 1 wherein said metering body is substantially indeformable and has a low coefficient of thermal expansion.

4. The device of claim 1 wherein said means supporting said metering body comprises springs.

5. The device of claim 1 wherein said mechanical-electrical transducer comprises a differential transformer, the body of which is connected to said container and the core of which is connected to said metering body.

6. The device of claim 2 wherein said trio of references connected to said three comparators are selected so that the first and third comparators will cause switching of said first bi-stable device in correspondence with two pre-established liquid levels in said container whereby said electrically controlled valve will open at the minimum level in said container and will close at the maximum level of said container, and the second comparator causes switching of said second bi-stable means in correspondence with the liquid level in the container in between said maximum and minimum levels.

7. A device for measuring the flow of liquids, particularly of fuels, comprising in combination a container for containing said liquid, an inlet and outlet aperture in said container, an undeformable measuring body of thermally stable material partly immersed in said container, an electrically controlled valve controlling the delivery of said liquid into the container through said inlet aperture, spring means fastened to said container and to said measuring body to deflect proportionally to the level of the liquid in the container, a transducer, coupled to the spring means and to said container, an electrical generator driving said transducer, first, second and third comparators each having a non-inverting input, and an inverting input and an output, said non-inverting inputs being connected to said transducer, three reference sources connected to said inverting inputs respectively, a first flip-flop having a first input $j$ connected to the output of said first comparator, a second input $k$ connected to said third comparator and an output, a second flip-flop having a first input $j$ connected to the output of said second comparator, a second input $k$ and an output $q$, amplifier means having an input connected to said output $q$ of said first flip-flop and an output operatively connected to said electrically controlled valve to operate said valve to maintain liquid in said container between maximum and minimum levels, a timer having input connected to the output of said second flip-flop and an output connected to the second input $k$ of said second flip-flop, a digital voltmeter connected to said transducer and to the output $q$ of said second flip-flop, and a control source controlling said first and second flip-flops through a control switch, whereby the switching of said second flip-flop releases said digital voltmeter to respond to the output of said transducer and actuates the timer which, after its timing period, inhibits the voltmeter from responding to said transducer so that the digital voltmeter reads a quantity representative of liquid delivery rate at the conclusion of said timing period.

8. The devices claimed in claim 7 wherein said transducer comprises a differential transformer having a housing coupled to said container and a core within said housing connected to said measuring body to react to the vertical thrust exerted on said body under the action of the liquid.

* * * * *